United States Patent
Hu et al.

(10) Patent No.: US 8,561,100 B2
(45) Date of Patent: Oct. 15, 2013

(54) USING XPATH AND ONTOLOGY ENGINE IN AUTHORIZATION CONTROL OF ASSETS AND RESOURCES

(75) Inventors: Jie Hu, Toronto (CA); Joanna W. Ng, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 1481 days.

(21) Appl. No.: 12/180,337

(22) Filed: Jul. 25, 2008

(65) Prior Publication Data
US 2010/0023997 A1 Jan. 28, 2010

(51) Int. Cl.
*H04N 7/16* (2011.01)

(52) U.S. Cl.
USPC ...... 725/25; 725/1; 726/1; 707/602; 707/802; 705/50; 705/51; 705/52; 705/53; 705/54; 705/55; 705/56; 705/57; 705/58; 705/59; 705/60; 705/61; 705/62; 705/63; 705/64; 705/65; 705/66; 705/67; 705/68; 705/69; 705/70; 705/71; 705/72; 705/73; 705/74; 705/75; 705/76; 705/77; 705/78; 705/79

(58) Field of Classification Search
USPC ............ 726/1; 707/102, 602, 802; 705/50–79
See application file for complete search history.

(56) References Cited

U.S. PATENT DOCUMENTS

| | | | |
|---|---|---|---|
| 5,787,175 A * | 7/1998 | Carter .......................... 713/165 |
| 6,236,971 B1 * | 5/2001 | Stefik et al. ..................... 705/54 |
| 7,009,885 B2 | 3/2006 | Pekny |
| 7,093,200 B2 * | 8/2006 | Schreiber et al. ............. 715/835 |
| 7,174,327 B2 | 2/2007 | Chau et al. |
| 7,373,338 B2 * | 5/2008 | Thompson et al. ........... 707/690 |
| 7,925,592 B1 * | 4/2011 | Issa et al. ......................... 705/59 |
| 8,201,216 B2 * | 6/2012 | Cha et al. .......................... 726/2 |
| 2003/0131073 A1 * | 7/2003 | Lucovsky et al. ............. 709/219 |
| 2004/0107155 A1 * | 6/2004 | Yanosy ........................... 705/37 |
| 2004/0193607 A1 * | 9/2004 | Kudo et al. ....................... 707/9 |
| 2004/0207155 A1 * | 10/2004 | Jolicoeur ...................... 273/260 |
| 2005/0034107 A1 * | 2/2005 | Kendall et al. ................ 717/136 |
| 2005/0102530 A1 * | 5/2005 | Burrows ....................... 713/200 |
| 2006/0026113 A1 * | 2/2006 | Omoigui ......................... 706/55 |
| 2007/0005653 A1 * | 1/2007 | Marsh ........................ 707/104.1 |
| 2007/0011147 A1 * | 1/2007 | Falkenberg ....................... 707/3 |
| 2007/0038609 A1 * | 2/2007 | Wu .................................. 707/3 |
| 2007/0094145 A1 * | 4/2007 | Ta et al. .......................... 705/59 |
| 2007/0239471 A1 * | 10/2007 | Patton et al. ...................... 705/1 |
| 2008/0059448 A1 * | 3/2008 | Chang et al. ..................... 707/5 |
| 2008/0104124 A1 * | 5/2008 | Bao et al. ................... 707/104.1 |
| 2009/0077094 A1 * | 3/2009 | Bodain ........................... 707/10 |

OTHER PUBLICATIONS

Tous et al., "Architecture of a semantic XPath processor application to digital rights management", Proceedings of 6th International Conference E-Commerce and Web Technologies, EC-Web 2005, 2005, Germany, Springer-Verlag, Berlin, 1 page.

* cited by examiner

*Primary Examiner* — Nasser Goodarzi
*Assistant Examiner* — Paul Graham
(74) *Attorney, Agent, or Firm* — Yee & Associates, P.C.; David A. Mims, Jr.

(57) ABSTRACT

An embodiment defines access control allowing the expression of access control rules using ontology based semantics and references an ontology subset using XPath as the ontological expression. The access control rules or access criteria are defined by an access control statement and may be expressed using classification criteria and ontology classes. The access control statement comprises a structural description that is used to define an asset and a logical expression that may be used to express the classification criteria. The access control statement defines access policy for various assets.

19 Claims, 3 Drawing Sheets

USING XPATH AND ONTOLOGY ENGINE IN AUTHORIZATION CONTROL OF ASSETS AND RESOURCES

BACKGROUND

1. Field of the Invention

This disclosure relates to access control of assets and resources and more specifically to a fine-grained access control mechanism that uses ontology semantic references as access criteria for the authorization of access.

2. Description of the Related Art

In a system there may be resources or objects that require protection. A system may seek to restrict a user or a group of users from accessing certain assets or objects that may be stored or contained on the system. Controlling access may be achieved by an access control policy. Fine-grained asset control systems allow flexibility in specifying the access rights of individual users using an access control policy. The access control policy defines who can see what content that may be in the system. The access control policy may determine authorization and the level of authorization access to system resources.

In one example, a knowledge system may categorize its assets or resources into various industries. There may be a telecommunications industry sector, a retail industry sector, and a banking industry sector. Within each sector, there may be resources categorized under that sector. Default access policy normally grants users affiliated with a given sector (such as telecommunications) the access right to resources categorized under the sector with which the user is affiliated. Specifically, a user affiliated with the telecommunications sector may not be authorized to have access to assets or resources that are categorized under the retail industry sector. Similarly, a user in the retail industry sector may not be authorized to have access to resources that are categorized under the banking industry sector. Users outside of a particular sector may use explicit access control criteria to access resources that are categorized within the sector.

BRIEF SUMMARY

This disclosure describes the defining and processing of access control statements that may be expressed using an ontology semantic reference as access criteria.

According to one embodiment of innovative embodiments, there is provided a computer-implemented method of automatically defining an access control statement for an asset and evaluating the ontological references as part of the access control criteria using an ontology engine. The access control statement comprises a structural expression, a conditional expression and a classification expression.

According to another class of innovative embodiments, there is provided a system for determining authorization access. The system comprises an authorization control engine communicatively coupled to an authorization checkpoint. The system also includes an administrator interface that creates access controls statements and a policy specifications database that stores the access control statements.

According to another disclosed class of innovative embodiments, there is provided a computer program product comprising a computer-readable medium that tangibly embodies instructions to perform the method for defining a processing access control statements that are ontology-based.

The embodiments of the disclosure provide an advantage of semantic access control or granting access control by meaning instead of granting access control based on naming what is known through structural or conditional expressions.

The embodiments of the disclosure also provide an advantage of easy integration into the current use of access control criteria because it serves as a natural extension of the current access control policy by adding the classification expressions to structural and conditional expressions.

These and other advantages will be more clearly understood from the following detailed description taken in conjunction with the accompanying drawings and claims.

BRIEF DESCRIPTION OF THE SEVERAL VIEWS OF THE DRAWINGS

For a more complete understanding of the present disclosure and the advantages thereof, reference is now made to the following brief description, taken in connection with the accompanying drawings and detailed description, wherein similar or identical reference numerals represents similar or identical parts.

DETAILED DESCRIPTION

The present disclosure is described below with reference to flow chart illustrations and/or block diagrams of methods, systems, and computer program products according to the embodiments of the invention. It will be understood that each block of the flow chart illustrations and/or block diagrams, and combinations of blocks in the flow chart illustrations and/or block diagrams, can be implemented by computer program instructions.

In an embodiment of this disclosure, access control statements may be defined as part of an access control policy for fine-grained access control of assets. The access control statements allow access control rules to be expressed based on ontological relationships. Ontology is the classification of knowledge or information. The access control statements may include structural and/or conditional expressions concatenated to a classification expression. The classification expression may also be denoted as being an ontological reference. The access control statements with the structural and/or conditional expressions and the ontological reference may be processed to determine whether to grant or deny a request by a user to access resources or assets of a system.

Figure 1:
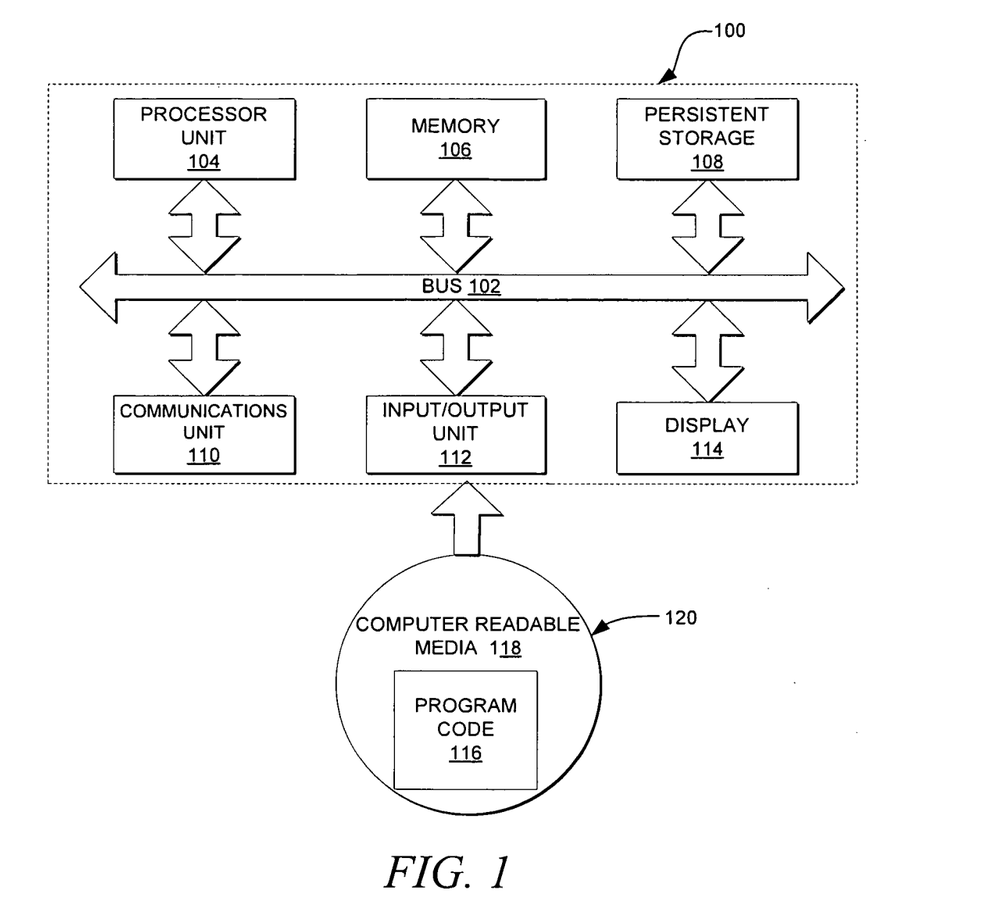
FIG. 1 is a diagram of a system that may be used to implement embodiments of the current disclosure.

With reference now to the figures, and in particular with reference to FIG. 1, an exemplary diagram of a data processing environment is provided in which illustrative embodiments may be implemented. It should be appreciated that FIG. 1 is only exemplary and are not intended to assert or imply any limitation with regard to the environments in which different embodiments may be implemented. Many modifications to the depicted environments may be made.

FIG. 1 depicts a pictorial representation diagram of a data processing system in accordance with an illustrative embodiment of the current disclosure. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 may be located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
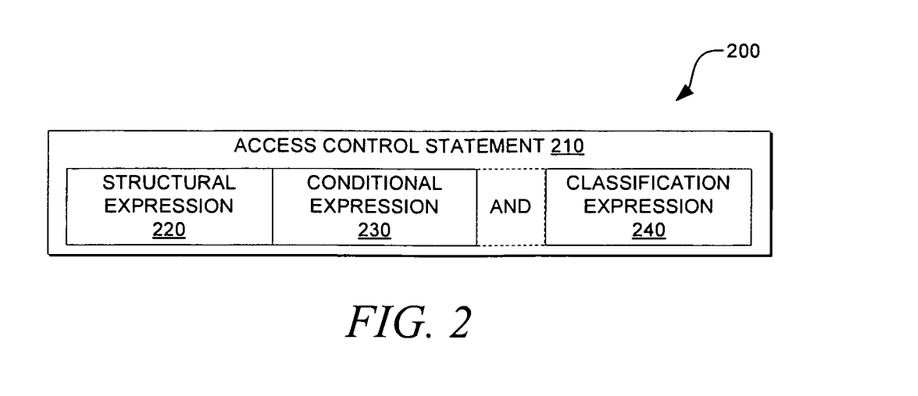
FIG. 2 is a representation of an access control statement according to one embodiment of the current disclosure.

FIG. 2 depicts a representation 200 of an access control statement 210 that comprises access criteria. The access control statement 210 may define access criteria or an access control rule that is part of an access control policy that determines whether a user may access assets or resources within a system. Access control statement 210 may comprise one or more structural expressions 220 and/or conditional expressions 230 coupled with one or more classification expressions 240. The structural expression 220 of access control statement 110 defines the fixed relationships of assets that do not change. Examples of structural expressions are shown in Table 1 below.

Table 1 illustrates an asset manifest file that describes the properties and structure of an asset. The format of the asset manifest file is based on Reusable Asset Specification version 2.2 (December 2007), which is incorporated herein for all purposes. One example of a structural expression is <freeFormDescriptor name="Author"/>. Another example may be <artifact name="NOTICES.txt", type="artifact1">. The structural expressions declare fixed attributes of an asset that do not change.

A conditional expression requires computation to determine it final value or state which may change depending on its value at runtime. The asset may also be defined based on a classification scheme that is defined using semantic ontology definitions.

TABLE 1

<?xml version="1.0" encoding="ASCII"?>
<defaultprofile:Asset xmi:version="2.0"
xmlns:xmi="http://www.omg.org/XMI"

TABLE 1-continued

```
xmlns:defaultprofile="http:///defaultprofile.ecore" name="Sample asset"
id="{7346B200-E2C2-2621-038D-FCACDECF2215}" date="2007-01-
15" state="APPROVED"
version="1.0" shortDescription="new asset">
<classification>
<descriptorGroup name="Default">
<freeFormValue value="jiehu@ca.ibm.com"
freeFormDescriptor="//@classification/@descriptorGroup.0/@freeForm
Descriptor.6
"/>
<freeFormDescriptor name="Author"/>
<freeFormDescriptor name="Benefit"/>
<freeFormDescriptor name="Keyword"/>
<freeFormDescriptor name="Known Uses"/>
<freeFormDescriptor name="Disclaimer"/>
<freeFormDescriptor name="Problem Solved"/>
<freeFormDescriptor name="Submitter"/>
</descriptorGroup>
<context name="Industry">
<descriptorGroup name="http://mycompany.com:9080/Sector">
<freeFormDescriptor name="Food_Service"/>
</descriptorGroup>
</context>
<context name="Geography">
<descriptorGroup name="http://mycompany.com:9080/Geography">
<freeFormDescriptor name="Canada"/>
</descriptorGroup>
</context>
</classification>
<solution>
<artifact name="NOTICES.txt" type="artifact1">
reference value="NOTICES.txt"/>
</artifact>
</solution>
<profile name="Default Profile"
idHistory="F1C842AD-CE85-4261-ACA7-178C457018A1::31E5BFBF-
B16E-4253-8037-98D70
D07F35F" versionMajor="2" versionMinor="2"/>
<description value="sample asset long description"/>
</defaultprofile:Asset>
```

Ontology provides the ability to define access based on semantically equivalent relationships between classes. Table 1 provides examples of classification expressions. In Table 1, 'http://mycompany.com:9080/Sector=Food_Service' is one example of a classification. Another example of a classification is 'http://mycompany.com:9080/Geography=Canada'. The classification scheme used in the Asset Manifest file of Table 1 may be defined in an Ontology Web Language (OWL) file. Further information about the OWL format may be found in OWL Web Ontology Language Guide, which is incorporated herein for all purposes. Table 2, below, illustrates an example of the OWL file that may be used to define the classification association in the Asset Manifest file of Table 1.

TABLE 2

```
<?xml version="1.0"?>
<rdf:RDF
  xmlns:rdf="http://www.w3.org/1999/02/22-rdf-syntax-ns#"
  xmlns:rdfs="http://www.w3.org/2000/01/rdf-schema#"
  xmlns:owl="http://www.w3.org/2002/07/owl#"
  xmlns="http://mycompany.com:9080/Sector#"
  xml:base="mycompany.com:9080">
<owl:Ontology rdf:about="">
<owl:imports
  rdf:resource="http://mycompany.com:9080/Industry.owl"/>
</owl:Ontology>
<owl:Class rdf:ID="Food_Service">
<rdfs:subClassOf>
<owl:Class rdf:ID="Retail"/>
</rdfs:subClassOf>
</owl:Class>
<owl:Class rdf:ID="General_Merchandise">
<rdfs:subClassOf rdf:resource="#Retail"/>
```

TABLE 2-continued

```
</owl:Class>
<owl:Class rdf:ID="Catalog-or-Direct_Marketing">
<rdfs:subClassOf rdf:resource="#Retail"/>
<owl:equivalentClass
  rdf:resource="http://mycompany.com/Industry#Online_Sh
opping" />
</owl:Class>
```

Table 2 illustrates an asset class, "Retail" and defines the relationships existing within the 'Retail' class as 'Food_Service', 'General_Merchandise', and 'Catalog-or-Direct_Marketing'. Table 2 shows how an equivalent class may be expressed as "http://mycompany.com/Industry#Online_Shopping/>.

Access criteria may be expressed using a programming language that is capable of combining a structural expression with an ontology-based reference. In an embodiment of this disclosure, the XML Path (XPATH) language is used to express the access control statements. In one example, the following access control statement "'state=approved" and "submission date is 01/01/2007-30/01/2007" and "classified as Retail in Sector" and "classified as Canada in Geography"' comprises the conditional statements "'state=approved" and "submission date is 01/01/2007-30/01/2007"' concatenated with the classification statements "'classified as Retail in Sector" or "classified as Canada in Geography"'. The access control statement may be converted into a two part expression: 1): /asset[@state='approved' and (@date>='2007-01-01' and @date<='2007-01-30')] and 2): ('http://mycompany.com:9080/Sector'='Retail') and ('http://mycompany.com:9080/Geography'='Canada'). The two parts may be evaluated separately in a system such as a semanontology system that may simultaneously process structural and ontology expressions. The semanontology system is described in detail further in this disclosure.

Figure 3:
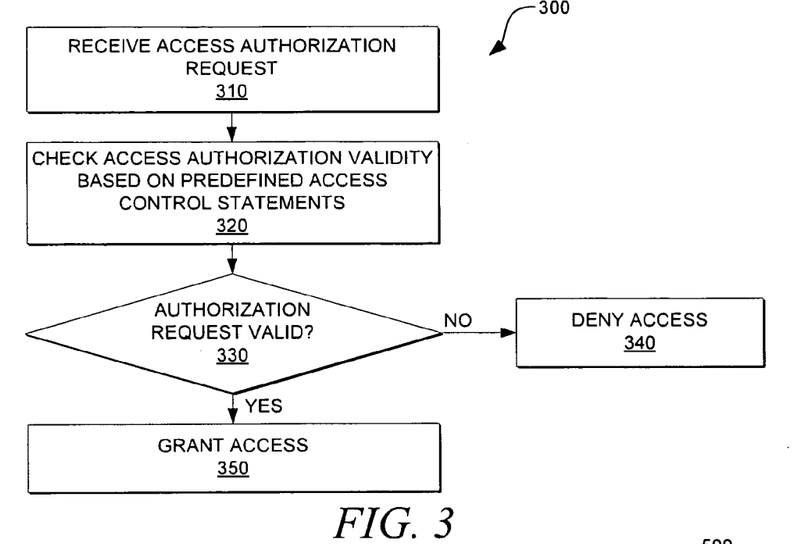
FIG. 3 is a top-level flowchart of the general process according to one embodiment of the current disclosure.

FIG. 3 depicts a flowchart that discloses the process 300 that involves the semanontology system that processes access control statements and access authorization requests. Process 300 begins upon receiving an access authorization request at block 310. The access authorization request queries permission or authorization to control specific assets or resources in a database. Control of specific assets or resources may include, but is not limited to, actions of viewing, changing, deleting, updating, and selecting resources or assets in a database or system. At a block 320, the access authorization request may be evaluated based on the predefined access control statements to determine the validity of the request for access authorization. The authorization request may be determined as valid if the access authorization request matches or corresponds with the predefined access control statements. The request may match or correspond with the predefined access control statements if the access authorization request is determined to be semantically equivalent to one or more predefined access criteria of the access control statement. Access may be granted at a block 350 if the authorization request is determined to be valid. Access may be denied at a block 340 if the authorization request is determined not to be valid.

Figure 4:
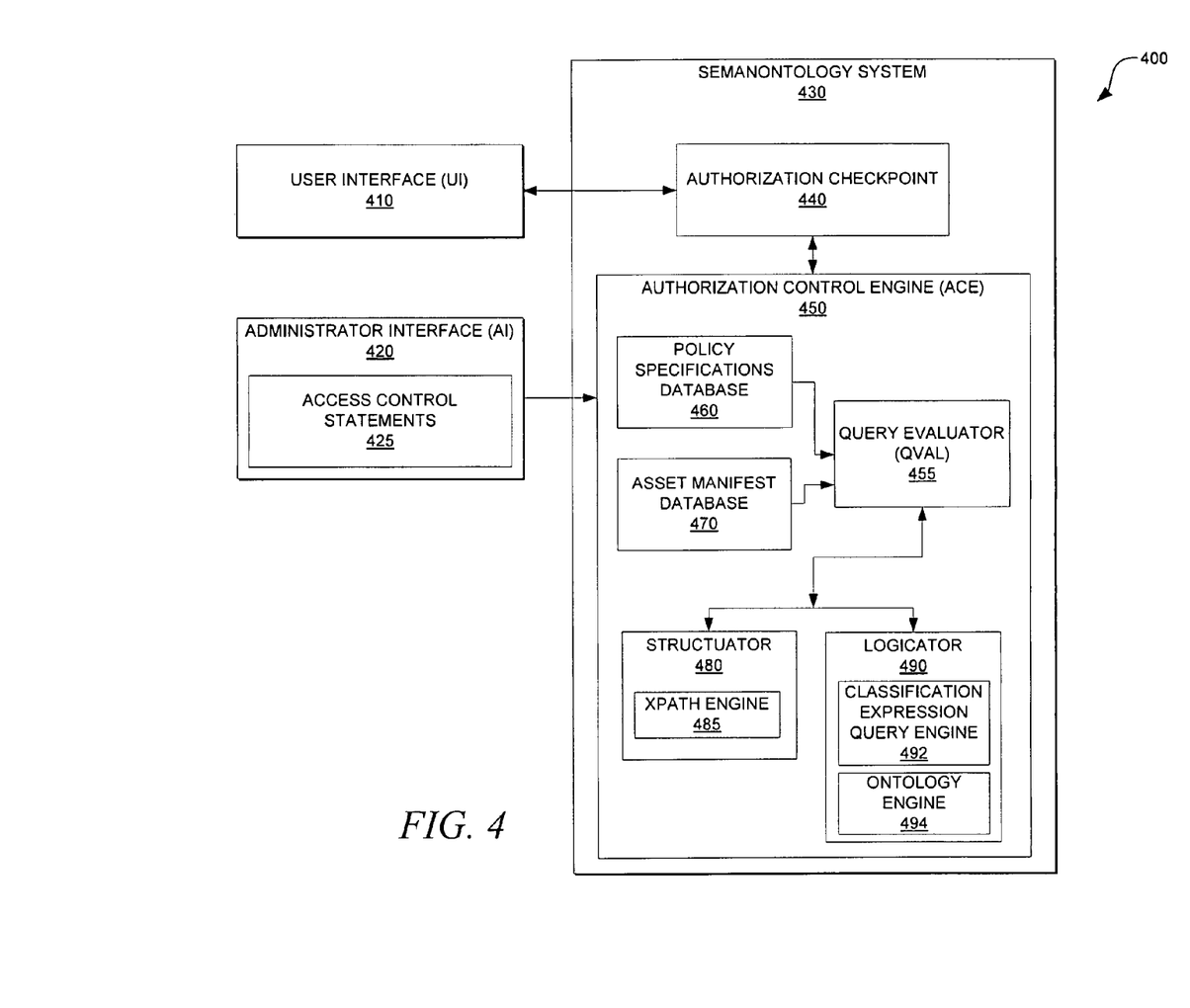
FIG. 4 is a an organizational diagram detailing the relationships within a system according to one embodiment of the disclosure.

FIG. 4 provides an exemplary implementation 400 of the access control procedures. The implementation 400 includes an administrative interface (AI) 420 that may be used to create access control statements 425. AI 420 may include a drop-down menu that enables the selection of pre-coded XPath expressions as ontology expressions to create access control statements. The XPath expressions include ontology classifications to define the access control policy that governs user authorization. The expressions may include expressions such as "equivalent", "mutually exclusive", "subclass of", and "instance of". The selected expressions may then be concatenated together using an appropriate Boolean condition such as AND, OR, or similar Boolean operator.

The access control statements 425 may be created through the administrator interface 420 may be stored in a policy specifications database 460 for future reference. The policy specifications database 460 may store the access control statements that comprise an access policy that determines whether authorization or permission for access may be granted. A request or query for access to resources or information may be input through a user interface 410. The query may list several conditions which when evaluated determine whether access may be granted to system resources. One example of a query using the command 'ask' is "ask* where (<asset://{7346B200-E2C2-2621-038D-FCAC-DECF2215}_1.0>rdf:type<http://mycompany.com:9080/Sector#Retail)." The statement after the where operator comprises the query. [EXPLAIN QUERY: In this example, the query uses the expression asset://{7346B200-E2C2-2621-038D-FCACDECF2215}_1.0 and checks the asset manifest file of Table 1 to determine whether access is allowed. The classification expression <http://mycompany.com:9080/Sector#Retail) is also computed. Access may be granted when the logical computation of the conditions evaluate as true.

The query may be input into a semanontology system for evaluation. The semanontology system may evaluate the query to determine whether the query falls within the scope of a predefined access policy. The authorization result of the query evaluation may either grant access or deny access.

An authorization checkpoint 440 may accept the query and restrict access until evaluation of the query has concluded and an authorization result has been determined. The authorization result may be a Boolean or some other similar format that may be known to one of skill in the art. The authorization checkpoint 440 may forward the query to an authorization control engine 450 for evaluation.

The authorization control engine 450 may use the query to determine which asset or resource in the asset manifest database 470 is being referenced. It must be noted that every resource or asset may be referenced or identified by an asset manifest file. The query may reference the policy specifications database 460 to determine which logical expressions may be semantically equivalent to the query. The query evaluator 455 may be used to process the information provided from the policy specifications database 460 and the asset manifest database 470. The query evaluator 455 may input the query received from the authorization checkpoint 440 and break the query into a structural portion and a classification portion. The structural portion may be comprised of one or more structural or conditional expression. The classification portion may be comprised of one or more classification expressions. The query evaluator 455 may extract the structural portion of the query for evaluation by a structuator 480. The classification expression may be extracted by the query evaluator 455 for evaluation by a logicator 490. The structural portion and the classification portion may be expressed in a programming language, such as XPath, which is capable of combining structural queries and ontology references in one expression. Other programming languages having a similar capability may be used as will be recognized by one of skill in the art.

The structuator 480 may evaluate the structural properties of the expression using an XPath engine 485. The logicator 490 may invoke a classification expression query engine 492 and ontology engine 494 to determine whether the classification expression is an instance of the asset manifest file. The classification expression query engine 492 may compute the total set of resource instances that fall within the classification expression (or ontology references). The classification expression query engine 492 also resolves all related ontology relationships such as "equivalent of", "exclusive of", An authorization result that grants or authorizes access may result based on a valid evaluation result from the structuator 480 and the logicator 490. The query evaluator may return the evaluation result to the authorization checkpoint 440.

Figure 5:
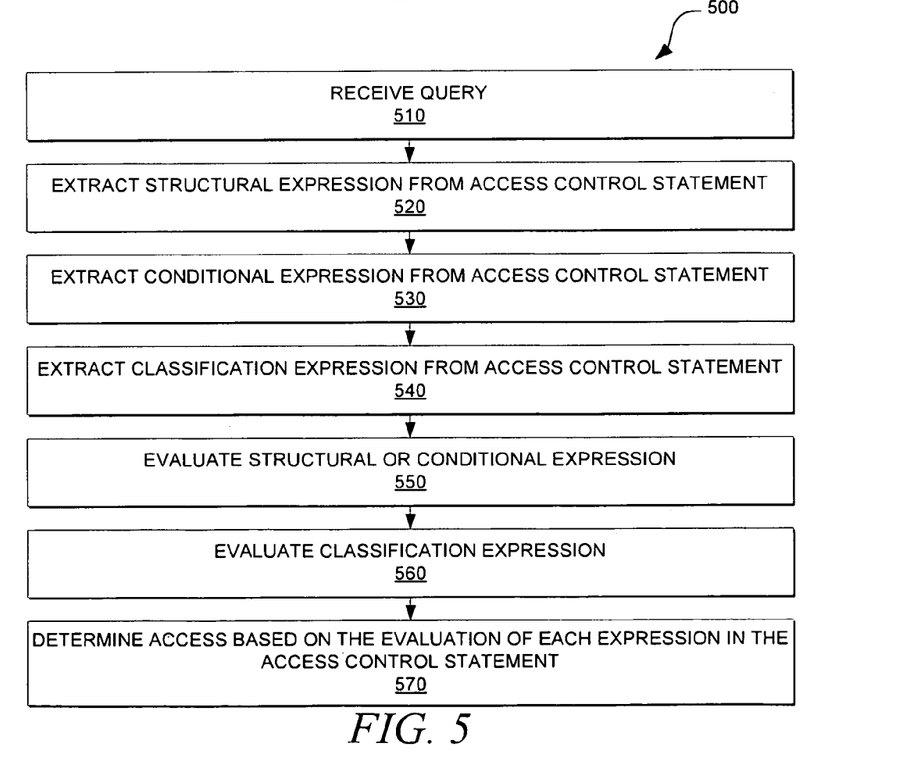
FIG. 5 is a flow chart of the process using the organizational diagram illustrated in FIG. 3 according to one embodiment of the current disclosure.

FIG. 5 illustrates a flowchart 500 of one embodiment of the processing that includes the system detailed in FIG. 4. A query may be received at a block 510. The query may comprise a structural portion and/or a conditional portion and a classification portion. The structural portion of the query may be extracted at a block 520. The conditional expression portion may be extracted at a block 530 and the classification expression portion of the query may be extracted at a block 540. The structural portion of the query may be evaluated at a block 550 based on the structural or conditional expression of an access control statement. The classification portion of the query may be evaluated at a block 560 based on the classification expression of the access control statement. At a block 570, authorization to access resources or assets may be determined based on the result of the evaluation of each expression in the access control statement. The evaluation may be performed by a logical computation of the expressions in the access control statements.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of enabling access control, the method comprising:
    automatically defining an access control statement, for determining authorization request validity using an authorization control engine for an asset, the access control statement comprising a first portion comprising one or more of a structural expression, and a conditional expression wherein the structural expression declares fixed relationships of the asset and a second portion comprising one or more of a classification expression comprising ontology expressions; and
    evaluating the first portion separately but simultaneously with the classification expression in the second portion of the access control statement, wherein the second portion uses an ontology engine.

2. The computer implemented method of claim 1, further comprising:
    receiving an authorization query, the authorization query comprising an asset instance; and
    determining an access authorization based on the authorization query and the evaluation of the access control statement.

3. The computer-implemented method of claim 1, further comprising: parsing a plurality of predefined access control statements.

4. The computer-implemented method of claim 1, wherein the one or more of the structural expression specifies a condition and the one or more of the classification expression includes a logical expression which specifies an ontology classification.

5. The computer-implemented method of claim 1, wherein the access control statement characterizes a policy expression that controls an access authorization.

6. The computer-implemented method of claim 1, wherein the access control statement comprises multiple conditions that include ontology classifications.

7. The computer implemented method of claim 1, wherein the automatically defining comprises:
    selecting from a group of ontology expressions an ontology term consisting of one of equivalent, mutually exclusive, subclass of, and instance of.

8. The computer implemented method of claim 2, wherein the evaluating comprises determining whether the access control statement is semantically equivalent to the authorization query.

9. The computer implemented method of claim 1, wherein the defining comprises automatically selecting ontology expressions.

10. The computer implemented method of claim 1, wherein the access control statement is defined using an XML Path Language (XPath).

11. The computer implemented method of claim 1, further comprising:
    determining access authorization by querying the ontology engine to determine whether an asset instance is a specified classification.

12. A system for determining access authorization, comprising:
    a bus;
    persistent storage connected to the bus;
    a memory connected to the bus, wherein the memory has program code stored therein;
    a communications unit connected to the bus;
    a processor unit connected to the bus, wherein the processor unit executes the program code stored in the memory to direct the system to create:
    an authorization control engine that evaluates a semantic ontology expression and a structural expression contained within an access control statement for determining authorization request validity using the authorization control engine for an asset, defining the access control statement for the asset, wherein the access control statement comprises a first portion comprising one or more of a structural expression, and a conditional expression wherein the structural expression defines fixed relationships of the asset and a second portion comprising one or more of a classification expression comprising ontology expressions; and
    an authorization checkpoint communicatively coupled to the authorization control engine that restricts access until authorization is determined.

13. The system of claim 12, wherein the authorization control engine and authorization checkpoint are part of a semanontology system for determining access authorization.

14. The system of claim 12, wherein the authorization control engine evaluates whether terms are semantically equivalent.

15. The system of claim 12, further comprising:
    an administrator interface that automatically enables selection of pre-coded XPath expressions as ontological expressions; and
    a policy specification database that stores the access control statements defined previously.

16. The system of claim 12, wherein the authorization control engine comprises a logicator that processes a logical expression contained within the access control statement.

17. The system of claim 16, wherein the logicator comprises a classification expression query engine and an ontology engine that process the semantic ontology expression.

18. The system of claim 12, wherein a structuator comprises an XPath engine that processes the structural expression.

19. A computer program product for enabling access control comprising:
    a computer-readable non-transitory recordable storage medium tangibly embodying computer executable instructions which when executed by a processor performs a method comprising:
    automatically defining an access control statement, for determining authorization request validity using an authorization control engine for an asset, the access control statement comprising a first portion comprising one or more of a structural expression, and a conditional expression wherein the structural expression declares fixed relationships of the asset and a second portion comprising one or more of a classification expression comprising ontology expressions; and evaluating the first portion separately but simultaneously with the classification expression in the second portion of the access control statement, wherein the second portion uses an ontology engine.

* * * * *